(12) United States Patent
Morgan

(10) Patent No.: US 11,075,510 B1
(45) Date of Patent: Jul. 27, 2021

(54) GUARDED CONSTRUCTION

(71) Applicant: Sean Morgan, Salinas, CA (US)

(72) Inventor: Sean Morgan, Salinas, CA (US)

(*) Notice: Subject to any disclaimer, the term of this patent is extended or adjusted under 35 U.S.C. 154(b) by 249 days.

(21) Appl. No.: 16/168,519

(22) Filed: Oct. 23, 2018

Related U.S. Application Data

(60) Provisional application No. 62/576,580, filed on Oct. 24, 2017.

(51) Int. Cl.
| | |
|---|---|
| *H01R 43/00* | (2006.01) |
| *H02G 3/14* | (2006.01) |
| *H02G 3/08* | (2006.01) |
| *H02G 3/12* | (2006.01) |

(52) U.S. Cl.
CPC ............... *H02G 3/14* (2013.01); *H02G 3/081* (2013.01); *H02G 3/12* (2013.01); *Y10T 29/49169* (2015.01)

(58) Field of Classification Search
CPC .......... H02G 3/14; H02G 3/121; H02G 3/086; H01R 13/5213; Y10T 29/49169; Y10T 29/49174; Y10T 29/49194; Y10T 29/49208; Y10T 29/49002; Y10T 29/5313; H05K 5/03
USPC ................ 29/854, 428, 592.1, 825, 868
See application file for complete search history.

(56) References Cited

U.S. PATENT DOCUMENTS

| | | | |
|---|---|---|---|
| 6,681,948 B1 * | 1/2004 | Santa Cruz | H02G 3/12 174/66 |
| 8,110,742 B2 * | 2/2012 | Compagnone, Jr. | H02G 3/126 174/66 |

* cited by examiner

*Primary Examiner* — Thiem D Phan
(74) *Attorney, Agent, or Firm* — Rimon Law, P.C.

(57) ABSTRACT

A temporary cover is provided for protecting the contents of electrical boxes during wall construction. The box can include the cover as a temporary attachment that bends into place and is torn away when finished. The cover can also be a stand-alone component that press fits into the box and has means for removal from the box, such as a tab on one side, or an aperture sized to receive at least a finger. The cover can also have a fin to engage with slot rails within the electrical box. Constructing a wall includes mounting the box within the wall, adding wiring within the box, covering the box with the temporary cover, finishing the wall, then removing the cover and replacing it with the permanent box cover.

10 Claims, 6 Drawing Sheets

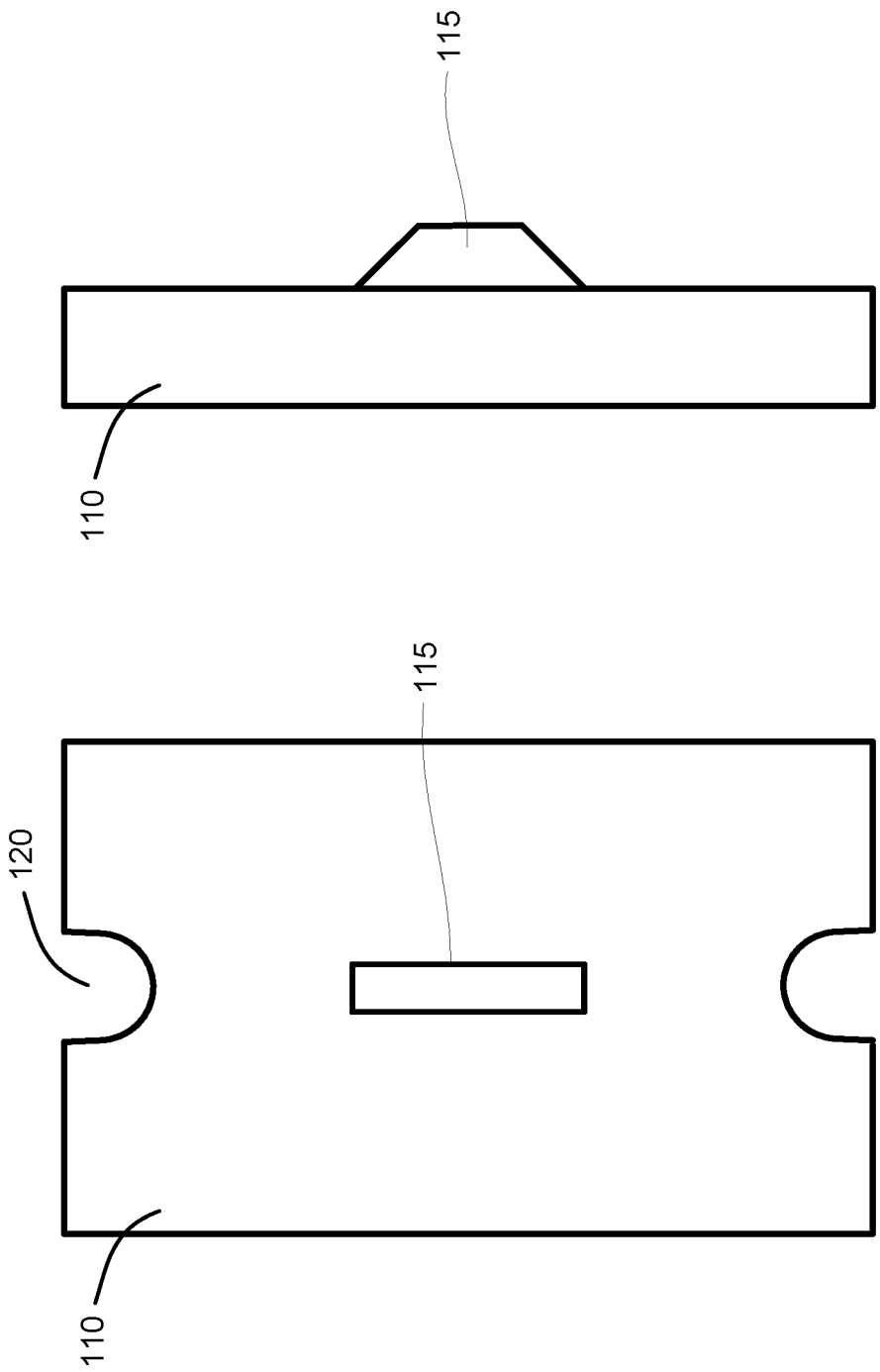

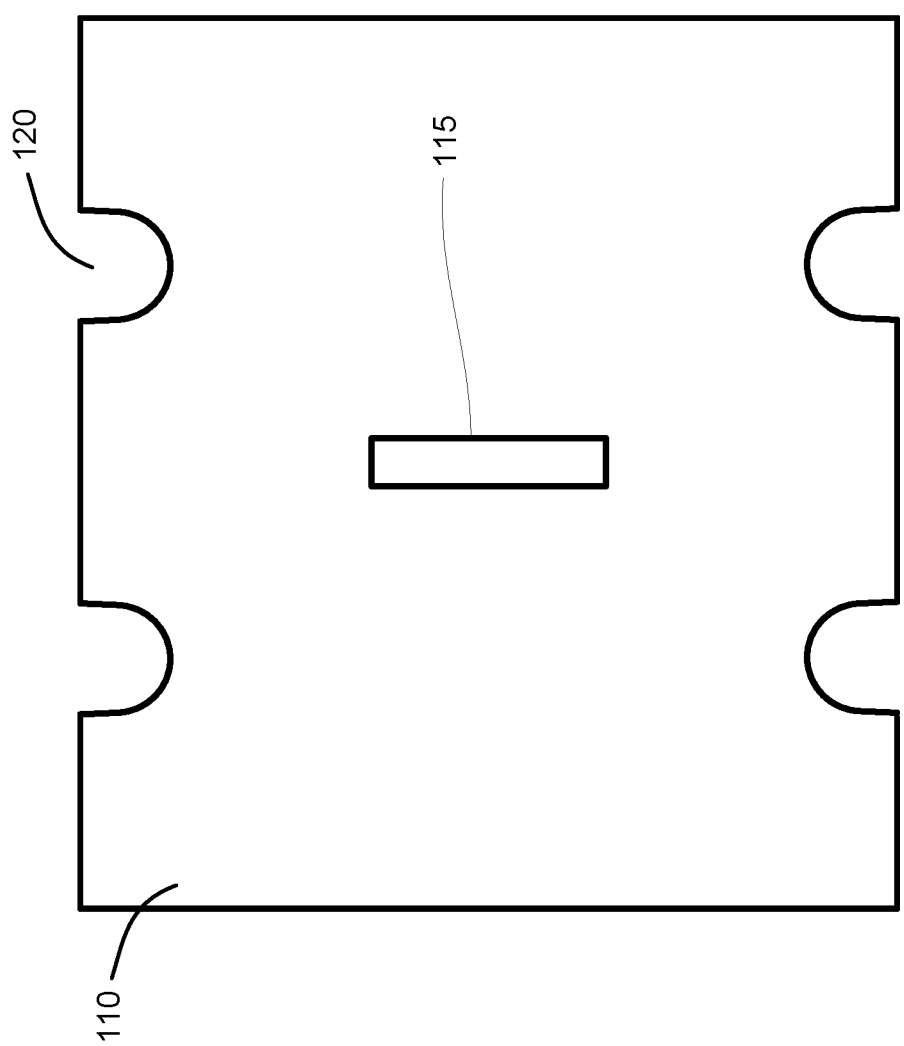

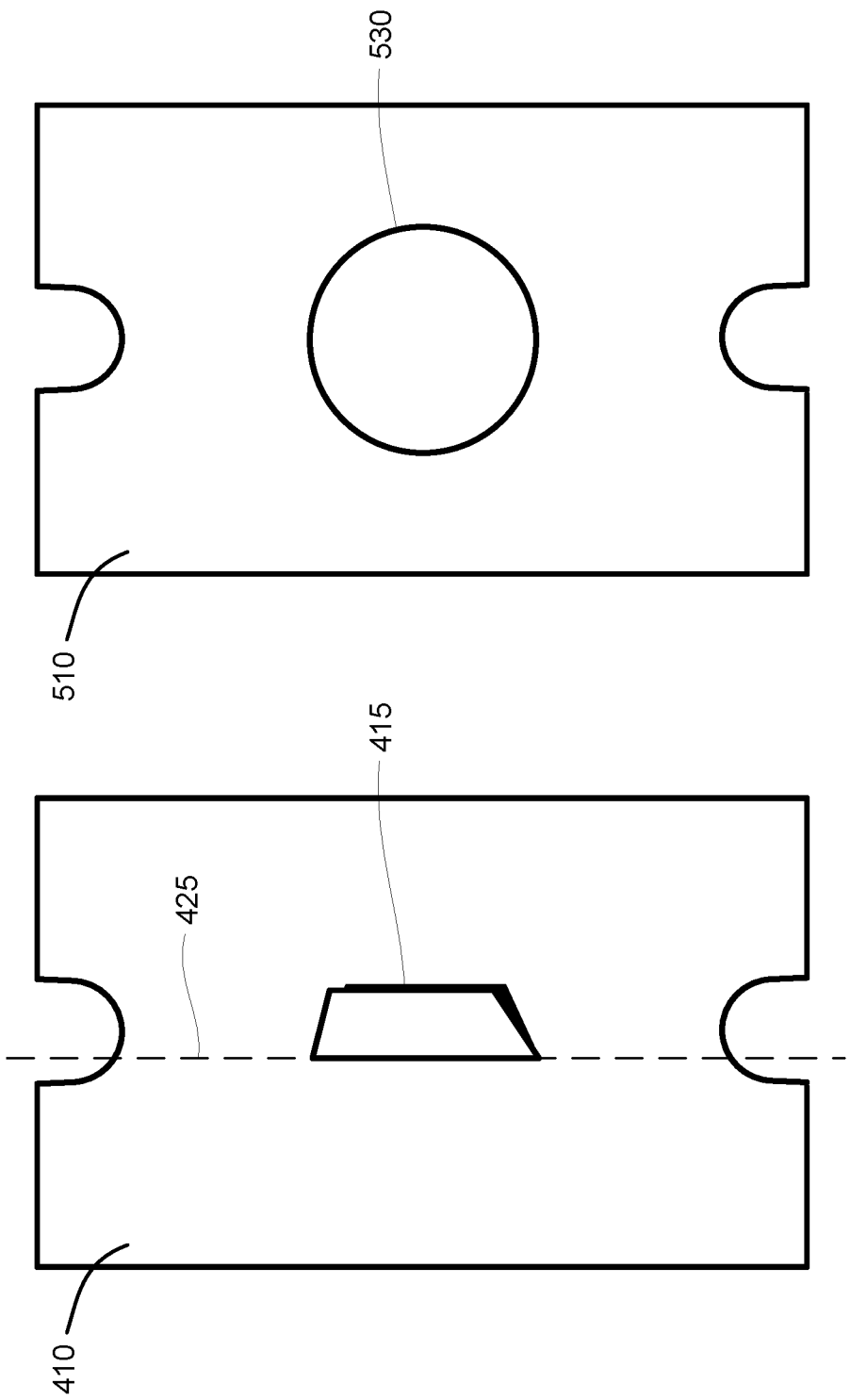

US 11,075,510 B1

GUARDED CONSTRUCTION

CROSS-REFERENCE TO RELATED APPLICATIONS

The present application claims the benefit of U.S. Provisional Application No. 62/576,580 filed on Oct. 24, 2017 and also entitled "Guarded Construction," the disclosure of which is incorporated herein by reference.

BACKGROUND

Field of the Invention

The invention is the field of construction.

Related Art

Building construction often involves the installation of components within a wall, e.g., ventilation and electrical boxes, prior to installation of drywall. Damage to these interior components can occur during drywall installation.

SUMMARY

Various embodiments of the invention include systems and methods of protecting electrical and other types of boxes and wires from construction processes including drywall routing, plastering and painting. For example, a temporary cover is used to protect electrical boxes and wires from damage by drywall routers. These temporary covers also keep plaster and paint away from the inside of the electrical box and wires. The temporary cover is installed by press fitting it into the electrical box after wiring is installed. As the temporary cover fits within the electrical box, it does not obstruct installation of drywall and is held in place by friction. The temporary cover optionally has a tab that can be grasped to remove the temporary cover from the electrical box after dry wall installation, routing, plaster and painting is completed.

BRIEF DESCRIPTION OF THE DRAWINGS

FIGS. 1 and 2 are top and side views, respectively, of a single gang temporary cover according to various embodiments of the invention.

FIG. 3 is a top view of a double gang temporary cover according to further embodiments of the invention.

FIG. 4 is a top view of a single gang temporary cover according to further embodiments of the invention.

FIG. 5 is a top view of a single gang temporary cover according to still further embodiments of the invention.

DETAILED DESCRIPTION

Figure 7:
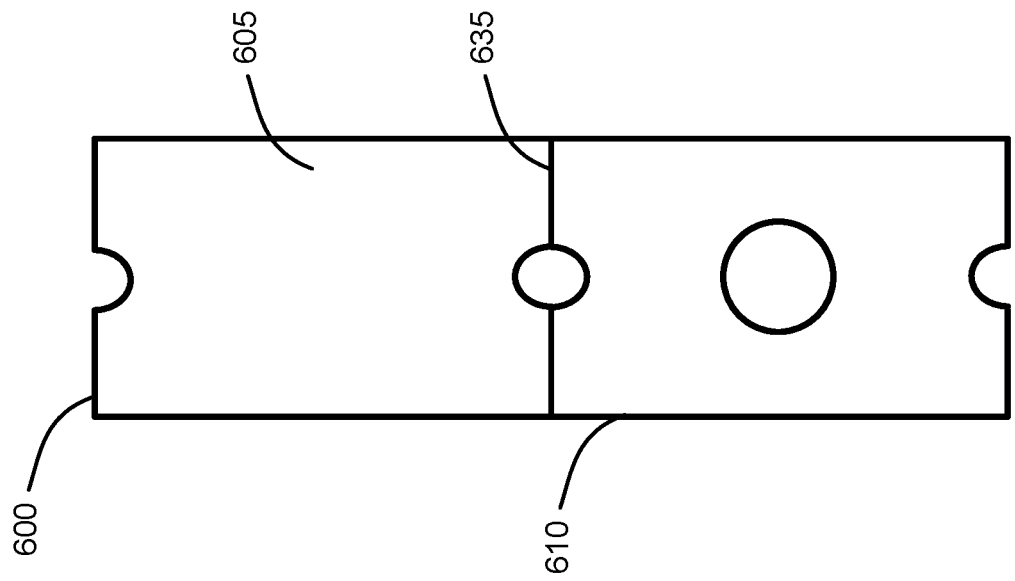
FIGS. 6 and 7 are side and front views, respectively, of an electrical box having a detachable temporary cover according to further embodiments of the invention.

FIG. 1 illustrates a top view of a temporary cover 110, according to various embodiments of the invention, while FIG. 2 shows a side view the same. The illustrated relative dimensions are not meant to be to scale. The temporary cover 110 is generally flat, thin, and shaped to fit snuggly within a standard size electrical box, or other in-wall component. The temporary cover 110 serves to protect wiring in the electrical box from damage due to cutting devices such as routers and saws, used in wall construction. Standard electrical box sizes include single gang, double gang, triple gang and quadruple gang. FIG. 1 shows a single gang embodiment, while FIG. 3 shows a top view of a double gang embodiment. The side view of the embodiment of FIG. 3 is the same as the one shown in FIG. 2. A triple gang embodiment is illustrated in the priority provisional application 62/576,580 and quadruple gang embodiments can be readily extrapolated from the prior examples.

In these embodiments, the temporary cover 110 also includes a tab 115 projecting from one side thereof to allow the temporary cover 110 to be removed easily. The temporary cover 110 and tab 115 can be constructed, for example, of cardboard, plastic, corrugated plastic, Bakelite, foam, rubber, cloth, paper, metal, and/or the like. Ideally, the material is hard enough to prevent or reduce saw blade penetration and ridged enough to be held inside the box by the friction between the temporary cover and the inside of the box. The temporary cover 110 is optionally flexible to better allow for a press-fit into the electrical box and to allow for slight variation in box size and shape. Tab 115 can be located in a variety of alternative locations, such as centrally located, as illustrated. While one tab 115 is illustrated, more than one can be implemented for larger temporary covers 110. The temporary cover 110 can also include recesses 120 sized and positioned to accommodate the screws of the electrical box used to connect the external cover after the wall is completed.

FIG. 4 illustrates a top view of a single gang temporary cover 410, according to various embodiments of the invention. In these embodiments the temporary cover 410 includes a tab 415 that is formed by cutting into the temporary cover 410 to create the tab 415 such that the tab 415 rotates around a fold line 425. Cardboard is an example of a suitable material for temporary cover 410. One advantage of this embodiment is that temporary covers 410 stack flat for shipping.

FIG. 5 illustrates a top view of a single gang temporary cover 510, according to various embodiments of the invention. In these embodiments the temporary cover 510 includes an aperture 530 disposed therethrough, in place of a tab Like the previous embodiments, covers 510 stack flat for shipping. The aperture 530 is sized so that at least a finger or small tool can be easily inserted therethrough. While the aperture 530 illustrated in FIG. 5 is round, other shapes can be used.

Figure 6:
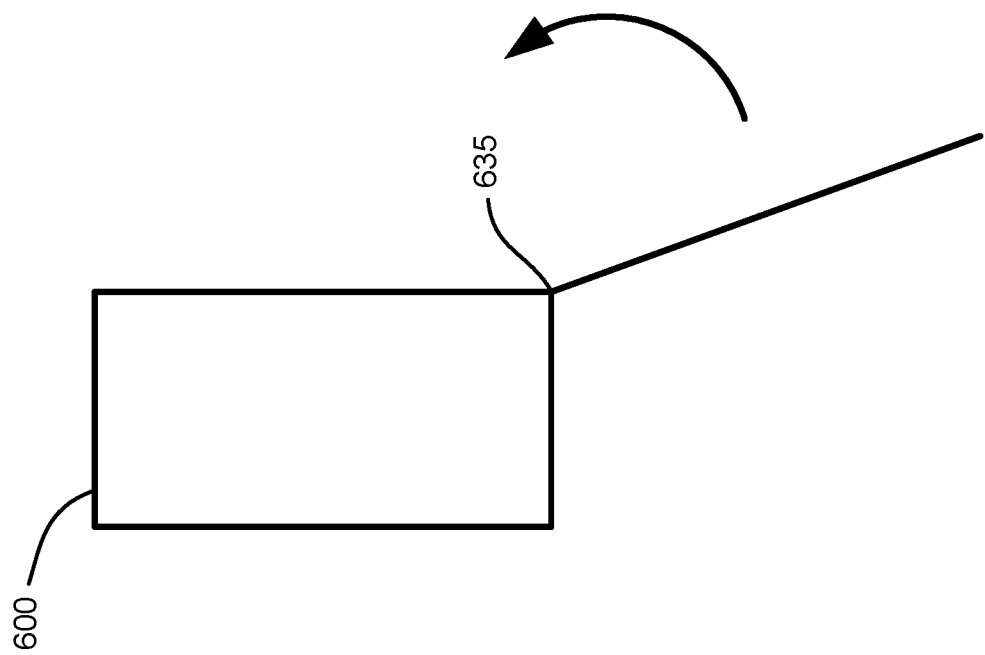

FIGS. 6 and 7 show side and front views, respectively, of an electrical box 600 having an open side 605 and a detachable temporary cover 610. The temporary cover 610 attaches to the electrical box 600 along a hinge 635. The hinge 635 can be perforated, for example, to allow the temporary cover 610 to be removed after use by tearing along the perforation. As illustrated in FIG. 6, the temporary cover 610 is rotated around the hinge 635 into place over the open side 605 to protect the interior of the electrical box 600.

Figure 8:
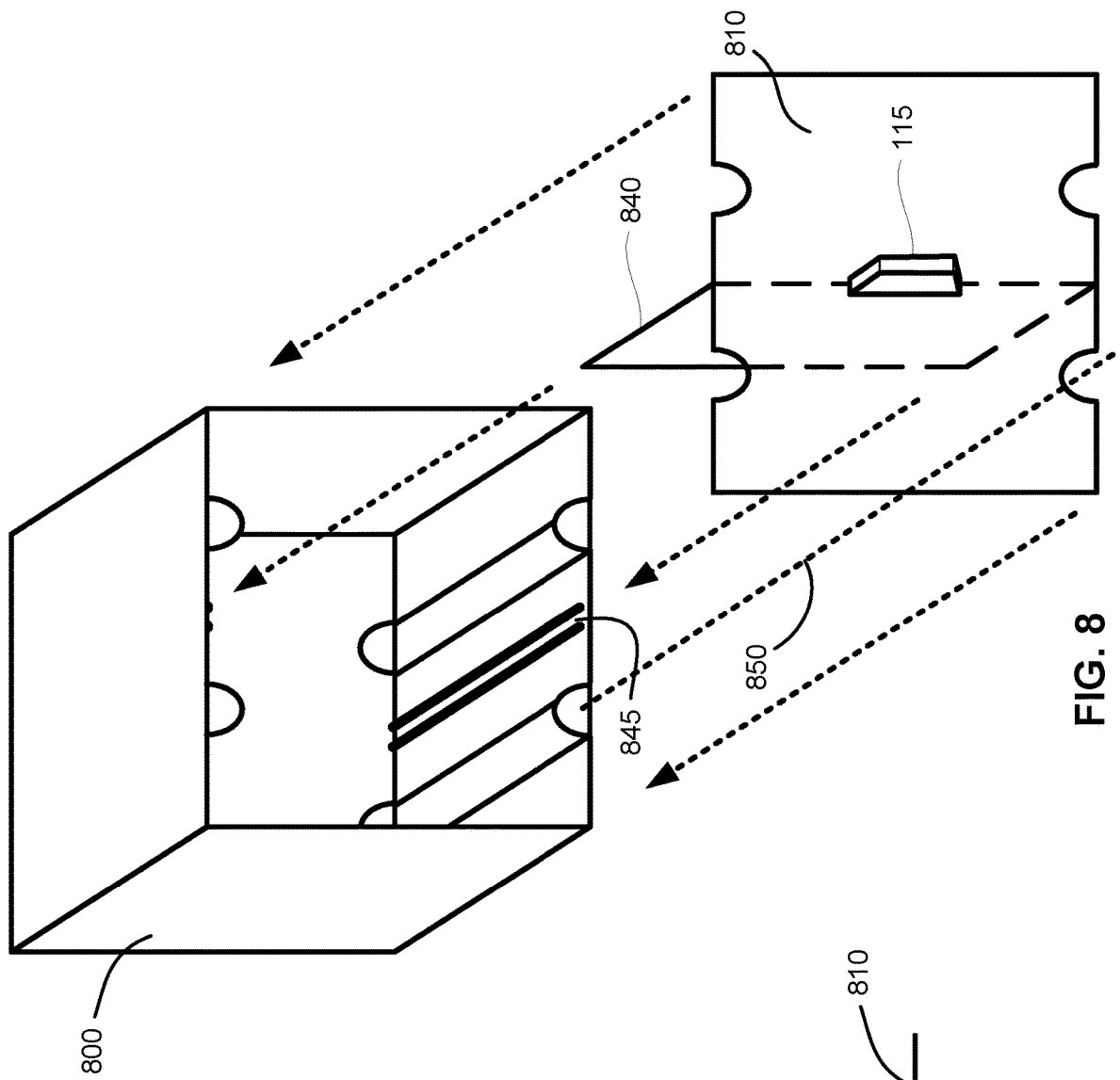
FIG. 8 is an exploded perspective view of a double gang electrical box and a double gang temporary cover according to further embodiments of the invention.
Figure 9:
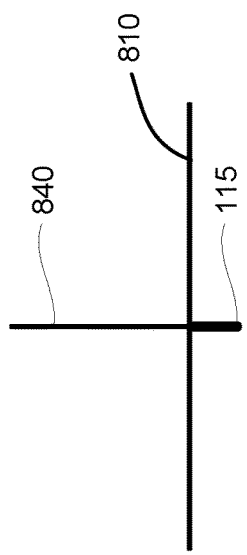
FIG. 9 is a top view of the temporary cover of the FIG. 8.

FIG. 8 illustrates an exploded view of a double gang electrical box 800 and a double gang temporary cover 810 for the box 800. FIG. 9 shows a top view of the temporary cover 810. The temporary cover 810, in this embodiment, includes a tab 115 and a fin 840. The fin 840 is disposed on the side opposite the fin 115 and engages with slot rails 845 inside of the electrical box 800. A screw (not shown)

optionally installs along line 850; the other lines for screws have been omitted for clarity.

Figure 10:
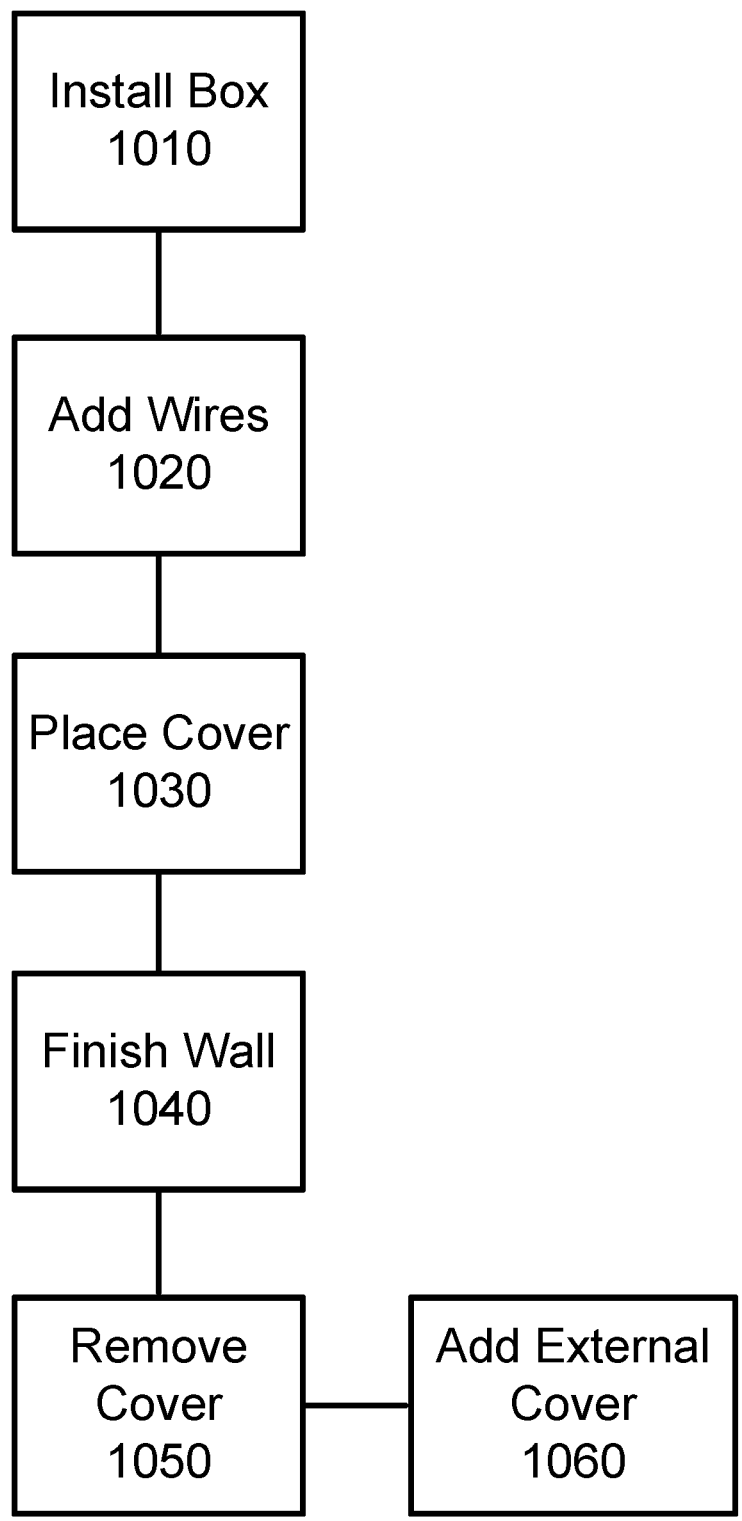
FIG. 10 is a schematic representation of a construction method according to various embodiments of the invention.

FIG. 10 illustrates a method of construction, according to various embodiments of the invention.

In an install box step 1010 an electrical box is installed in an unfinished wall, such as by attachment to a stud within the wall. The electrical box can be of a type for containing wires for a switch, low voltage audio controls, a light fixture, an electrical plug outlet, etc. An unfinished wall, as used herein, means a wall still under construction and missing at least one of drywall, necessary routing, plaster, or paint.

In a wiring step 1020 one or more wires disposed within the wall are added to the electrical box. As used herein, "wiring" will be broadly understood to include each of electrical wiring, optical cables, and pneumatic tubes.

In a place cover step 1030 a temporary cover is placed over an open side of the electrical box, the temporary cover being sized to fit the open side. Step 1030 can include press fitting the temporary cover into the open side of the electrical box, and in some of these embodiments the temporary cover is pushed into the electrical box until the temporary cover is well recessed within the box at the completion of the step. In other embodiments, step 1030 can include folding or bending the temporary cover along a common hinge with the electrical box. In still other embodiments, the temporary cover includes a fin projecting from a side of the temporary cover, the interior of the electrical box includes slot rails, and step 1030 includes engaging the fin with the slot rails. Additionally, in some embodiments step 1030 includes securing the temporary cover to the electrical box using the box's existing screws and screw receptacles.

In a finish wall step 1040 the wall is finished. This step includes at least one of adding drywall to the wall, routing, plastering and painting the wall.

In a removal step 1050 the temporary cover is removed from the electrical box. For example, the temporary cover can be grasped by a tab, or one can insert a finger or tool into an aperture through the temporary cover in order to pull the temporary cover out from the electrical box. In other embodiments, step 1050 includes removing one or more screws used to secure the temporary cover to the electrical box. Step 1050 can also comprise tearing away the temporary cover from the electrical box along a hinge, such as by tearing along a line of perforations. Such a common connection between the temporary cover and the electrical box can be broken in other ways, such as by fatiguing the hinge, where the box and cover are both made from a metal.

In an external cover step 1060 an external cover, such as electrical outlet wall plate configured to be secured to the electrical box, is secured to the electrical box, such as with the previously mentioned screws. Step 1060 can additionally include installing plugs, switches, controls and the like to wires in the electrical box before securing the external cover.

Several embodiments are specifically illustrated and/or described herein. However, it will be appreciated that modifications and variations are covered by the above teachings and within the scope of the appended claims without departing from the spirit and intended scope thereof. The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

The use of the term "means" within a claim of this application is intended to invoke 112(f) only as to the limitation to which the term attaches and not to the whole claim, while the absence of the term "means" from any claim should be understood as excluding that claim from being interpreted under 112(f). As used in the claims of this application, "configured to" and "configured for" are not intended to invoke 112(f).

The invention claimed is:

1. A method of construction, the method comprising:
installing a box within an unfinished wall;
adding wiring to the box;
placing a temporary cover on the box, the temporary cover including a tab formed by cutting into the temporary cover, by either press fitting the temporary cover into the box or by rotating the temporary cover into place around a hinge shared with the box;
finishing the wall; and
removing the temporary cover from the box.

2. The method of claim 1, wherein rotating the temporary cover into place around the hinge includes bending the hinge.

3. The method of claim 1, wherein press fitting the temporary cover into the box includes compressing a foam or rubber material of the temporary cover.

4. The method of claim 1, wherein the temporary cover is secured to the box with screws secured into screw receptacles of the box.

5. The method of claim 1, further comprising adding an external cover to the box, the external cover being configured to fit outside of the box.

6. The method of claim 1, wherein the box is an electrical box.

7. The method of claim 1, wherein the wiring includes electrical wiring.

8. The method of claim 1, wherein the temporary cover comprises cardboard.

9. The method of claim 1, wherein removing the temporary cover includes grasping the tab and pulling.

10. The method of claim 1, wherein finishing the wall includes adding drywall to the wall.

\* \* \* \* \*